(12) United States Patent
Nakamura

(10) Patent No.: US 12,400,778 B2
(45) Date of Patent: Aug. 26, 2025

(54) AMORPHOUS METAL RIBBON, METHOD FOR MANUFACTURING AMORPHOUS METAL RIBBON, AND MAGNETIC CORE

(71) Applicant: SEIKO EPSON CORPORATION, Tokyo (JP)

(72) Inventor: Atsushi Nakamura, Hachinohe (JP)

(73) Assignee: SEIKO EPSON CORPORATION, Tokyo (JP)

( * ) Notice: Subject to any disclaimer, the term of this patent is extended or adjusted under 35 U.S.C. 154(b) by 864 days.

(21) Appl. No.: 17/651,047

(22) Filed: Feb. 14, 2022

(65) Prior Publication Data

US 2022/0270793 A1    Aug. 25, 2022

(30) Foreign Application Priority Data

Feb. 19, 2021   (JP) .................................. 2021-024949

(51) Int. Cl.
| | |
|---|---|
| H01F 3/04 | (2006.01) |
| B23K 26/364 | (2014.01) |
| B23K 101/36 | (2006.01) |
| H01F 41/02 | (2006.01) |

(52) U.S. Cl.
CPC ............. *H01F 3/04* (2013.01); *B23K 26/364* (2015.10); *H01F 41/02* (2013.01); *B23K 2101/36* (2018.08)

(58) Field of Classification Search
None
See application file for complete search history.

(56) References Cited

U.S. PATENT DOCUMENTS

| | | |
|---|---|---|
| 4,685,980 A | 8/1987 | Sato et al. |
| 4,724,015 A | 2/1988 | Sato et al. |
| 9,290,831 B2 | 3/2016 | Yoshizawa et al. |
| 11,894,170 B2 | 2/2024 | Ochiai |
| 12,002,607 B2 | 6/2024 | Itagaki et al. |
| 2012/0154084 A1 | 6/2012 | Yoshizawa et al. |

(Continued)

FOREIGN PATENT DOCUMENTS

| | | |
|---|---|---|
| CN | 111801748 A | 10/2020 |
| CN | 111868854 A | 10/2020 |

(Continued)

OTHER PUBLICATIONS

Office Action for U.S. Appl. No. 17/674,966, issued on Aug. 31, 2023.

(Continued)

*Primary Examiner* — John J Norton
(74) *Attorney, Agent, or Firm* — CHIP LAW GROUP

(57) ABSTRACT

An amorphous metal ribbon includes a plurality of laser irradiation mark rows each including a plurality of laser irradiation marks arranged in a row, in which when a distance between the laser irradiation mark rows that are adjacent to each other is set as d1, a distance between the laser irradiation marks in the laser irradiation mark row is set as d2, a diameter of the laser irradiation mark is set as d3, a depth of the laser irradiation mark is set as d4, and a volume occupancy rate V of the laser irradiation marks is set as $(1/d1 \times d3 \times d4) \times (1/d2) \times 100$, the volume occupancy rate V of the laser irradiation marks is 0.00057% or more and 0.010% or less.

8 Claims, 3 Drawing Sheets

(56) References Cited

U.S. PATENT DOCUMENTS

| | | | | |
|---|---|---|---|---|
| 2016/0035474 A1* | 2/2016 | Azuma | ............. | B23K 26/0622 29/605 |
| 2021/0011564 A1 | 1/2021 | Ochiai | | |
| 2021/0057133 A1 | 2/2021 | Itagaki et al. | | |
| 2021/0098175 A1* | 4/2021 | Nakajima | ........... | H01F 41/0226 |

FOREIGN PATENT DOCUMENTS

| | | |
|---|---|---|
| JP | S6129103 A | 2/1986 |
| JP | H0332886 B | 2/1998 |
| JP | 5440606 B2 | 3/2014 |
| JP | 6041181 B2 | 12/2016 |
| WO | WO2011030907 A1 | 3/2011 |
| WO | 2019189813 A1 | 10/2019 |
| WO | 2020246588 A1 | 12/2020 |

OTHER PUBLICATIONS

Office Action for JP Patent Application No. JP2021024949, issued on Jun. 4, 2024, 6 pages of Office Action.

Office Action for CN Patent Application No. CN202210140981.4, issued on Jun. 20, 2024, 9 pages.

Office Action for CN Patent Application No. CN202210142102.1, issued on Jun. 20, 2024, 10 pages.

* cited by examiner

AMORPHOUS METAL RIBBON, METHOD FOR MANUFACTURING AMORPHOUS METAL RIBBON, AND MAGNETIC CORE

The present application is based on, and claims priority from JP Application Serial Number 2021-024949, filed Feb. 19, 2021, the disclosure of which is hereby incorporated by reference herein in its entirety.

BACKGROUND

1. Technical Field

The present disclosure relates to an amorphous metal ribbon, a method for manufacturing an amorphous metal ribbon, and a magnetic core.

2. Related Art

WO 2019/189813 discloses a Fe-based amorphous alloy ribbon having a plurality of laser irradiation mark rows each including a plurality of laser irradiation marks. In the Fe-based amorphous alloy ribbon, a distance (line distance d1) between the laser irradiation mark rows is 10 mm to 60 mm, and a distance (spot distance d2) between the laser irradiation marks is 0.10 mm to 0.50 mm. A number density D of the laser irradiation marks is represented by $D=(1/d1)\times(1/d2)$, and is 0.05 pieces/mm$^2$ to 0.50 pieces/mm$^2$.

In such a Fe-based amorphous alloy ribbon, an iron loss at an excitation magnetic flux density of 1.45 T is low, and an increase in excitation power is prevented. Accordingly, an iron core and a transformer having excellent performance can be realized.

In the Fe-based amorphous alloy ribbon described in WO 2019/189813, by controlling the line distance d1, the spot distance d2, and the number density D of the laser irradiation marks, magnetic domain refinement can be optimized, and the iron loss and the excitation power can be reduced. However, there is room for further improvement in magnetic domain refinement of the Fe-based amorphous alloy ribbon.

SUMMARY

An amorphous metal ribbon according to an application example of the present disclosure includes: a plurality of laser irradiation mark rows each including a plurality of laser irradiation marks arranged in a row, in which when a distance between the laser irradiation mark rows that are adjacent to each other is set as d1, a distance between the laser irradiation marks in the laser irradiation mark row is set as d2, a diameter of the laser irradiation mark is set as d3, a depth of the laser irradiation mark is set as d4, and a volume occupancy rate V of the laser irradiation marks is set as $(1/d1\times d3\times d4)\times(1/d2)\times 100$, the volume occupancy rate V of the laser irradiation marks is 0.00057% or more and 0.010% or less.

A method for manufacturing an amorphous metal ribbon according to an application example of the present disclosure includes: preparing a material ribbon having a main surface made of an amorphous metal; applying laser processing to the main surface of the material ribbon to obtain an amorphous metal ribbon having a plurality of laser irradiation mark rows each including a plurality of laser irradiation marks arranged in a row, in which when a distance between the laser irradiation mark rows that are adjacent to each other is set as d1, a distance between the laser irradiation marks in the laser irradiation mark row is set as d2, a diameter of the laser irradiation mark is set as d3, a depth of the laser irradiation mark is set as d4, and a volume occupancy rate V of the laser irradiation marks is set as $(1/d1\times d3\times d4)\times(1/d2)\times 100$, the volume occupancy rate V of the laser irradiation marks is 0.00057% or more and 0.010% or less.

A magnetic core according to an application example of the present disclosure includes: the amorphous metal ribbon according to the application example of the present disclosure.

DESCRIPTION OF EXEMPLARY EMBODIMENTS

Hereinafter, an amorphous metal ribbon, a method for manufacturing an amorphous metal ribbon, and a magnetic core according to the present disclosure will be described in detail based on preferred embodiments shown in the accompanying drawings.

1. Amorphous Metal Ribbon

An amorphous metal ribbon according to an embodiment is a ribbon made of an amorphous metal. The amorphous metal is a metal having no crystal structure. For example, a plurality of amorphous metal ribbons are stacked to form a laminate. Such a laminate is used as a magnetic core. The magnetic core is used in, for example, a transformer.

Figure 1:
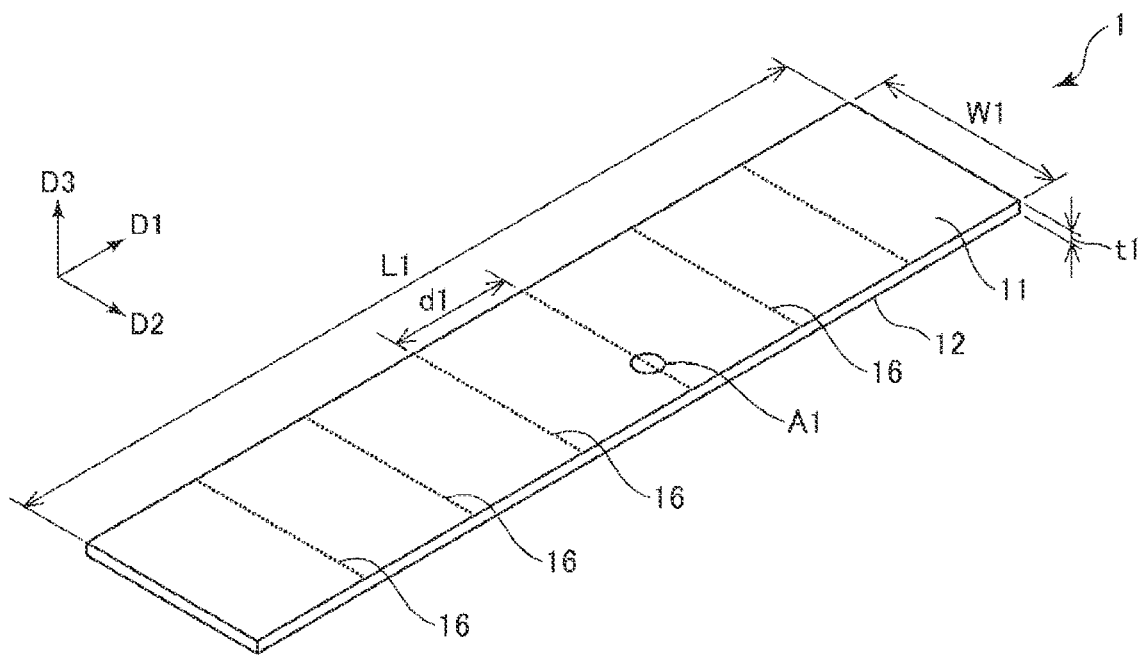
FIG. 1 is a perspective view schematically showing an amorphous metal ribbon according to an embodiment.
Figure 2:
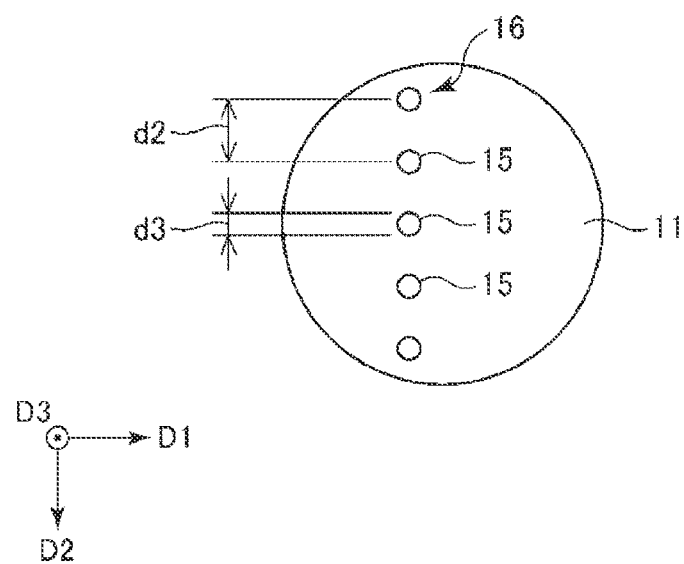
FIG. 2 is an enlarged view of a part A1 in FIG. 1.

FIG. 1 is a perspective view schematically showing an amorphous metal ribbon according to the embodiment. FIG. 2 is an enlarged view of a part A1 in FIG. 1. In FIG. 1, a length direction of an amorphous metal ribbon 1 is set as D1, a width direction thereof is set as D2, and a thickness direction thereof is set as D3. In FIG. 1, the three directions are indicated by arrows. Each direction described below includes both a direction from a proximal end to a distal end of the arrow and a direction from the distal end to the proximal end of the arrow.

In FIG. 1, a length of the amorphous metal ribbon 1 is set as L1, a width thereof is set as W1, and a thickness thereof is set as t1.

The ribbon has a first surface 11 and a second surface 12 having a front and back relation with each other, and has a shape that a thickness, which is a distance between the first surface 11 and the second surface 12, is sufficiently shorter than a width and a length of the first surface 11 and the second surface 12. The width of the first surface and the second surface, that is, the width W1 of the amorphous metal ribbon 1, is determined by a device or method for manufacturing the amorphous metal ribbon 1. Therefore, the width is not particularly limited, and is preferably 5 mm or more, more preferably 10 mm or more and 200 mm or less, and still more preferably 20 mm or more and 100 mm or less.

The length of the first surface 11 and the second surface 12, that is, the length L1 of the amorphous metal ribbon 1, is determined when the amorphous metal ribbon 1 is manufactured.

Therefore, the length is not particularly limited, and it is sufficient that the length is longer than the width W1 of the amorphous metal ribbon 1. As an example, the length L1 of the amorphous metal ribbon is preferably 1.5 times or more, and more preferably 2.0 times or more the width W1 of the amorphous metal ribbon 1.

Examples of the amorphous metal include Fe-based amorphous alloys such as Fe-Si-B based, Fe-Si-B-C based, Fe-Si-B-Cr-C based, Fe-Si-Cr based, Fe-B based, Fe-B-C based, Fe-P-C based, Fe-Co-Si-B based, Fe-Si-B-Nb based, and Fe-Zr-B based amorphous alloys, Ni-based amorphous alloys such as Ni-Si-B based and Ni-P-B based amorphous alloys, and Co-based amorphous alloys such as a Co-Si-B based amorphous alloy. Among these, the Fe-based amorphous alloys are excellent in soft magnetism and have a high saturation magnetic flux density, and thus are useful as constituent materials of the amorphous metal ribbon 1 used for a magnetic core or the like.

The thickness t1 of the amorphous metal ribbon 1, that is, a distance between the first surface 11 and the second surface 12 in the thickness direction D3, is not particularly limited, and is preferably 10 μm or more and 50 μm or less, and more preferably 20 μm or more and 35 μm or less. The amorphous metal ribbon 1 having such a thickness t1 achieves both sufficient mechanical strength and reduction in eddy current loss.

As shown in FIGS. 1 and 2, the amorphous metal ribbon 1 according to the embodiment has laser irradiation mark rows 16 provided on the first surface 11, each including a plurality of laser irradiation marks 15 arranged in a row.

Figure 3:
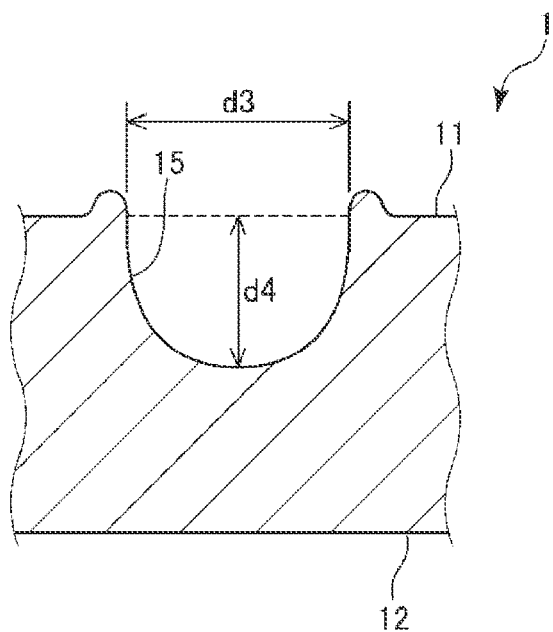
FIG. 3 is a cross-sectional view of a laser irradiation mark shown in FIG. 2.

FIG. 3 is a cross-sectional view of the laser irradiation mark 15 shown in FIG. 2.

As shown in FIG. 2, in the laser irradiation mark row 16, the laser irradiation marks 15 that are substantially circular shapes in a plan view are arranged in a row along the width direction D2 at a predetermined distance. That is, the laser irradiation mark row 16 is an aggregate of the laser irradiation marks 15 arranged in a row along the width direction D2. The laser irradiation mark 15 refers to a processing mark formed by irradiating the first surface 11 with a laser beam, and a processing mark at which the amorphous metal is melted by receiving the energy of the laser beam to form a concave shape as shown in FIG. 3.

By providing such laser irradiation marks 15 to satisfy a predetermined arrangement condition, magnetic domain refinement is optimized in the amorphous metal ribbon 1. Accordingly, in particular, it is possible to reduce an abnormal eddy current loss caused by the movement of a magnetic domain wall, which is a boundary between magnetic domains, and to reduce excitation power.

1.1. Line Distance

The distance between the laser irradiation mark rows 16 shown in FIG. 1 is set as a line distance d1. The line distance d1 is preferably 10 mm or more and 60 mm or less, more preferably 10 mm or more and 50 mm or less, and still more preferably 10 mm or more and 30 mm or less. When the line distance d1 is within the above range, an arrangement density of the laser irradiation mark rows 16 in the amorphous metal ribbon 1 can be optimized. As a result, even when a measurement is performed under a condition of a high magnetic flux density, an iron loss and the excitation power of the amorphous metal ribbon 1 can be reduced.

When the line distance d1 is less than the lower limit value, the excitation power of the amorphous metal ribbon 1, which is measured under the condition of a high magnetic flux density, may increase depending on other arrangement conditions of the laser irradiation marks 15 and the laser irradiation mark rows 16. When the line distance d1 is more than the upper limit value, the iron loss of the amorphous metal ribbon 1, which is measured under the condition of a high magnetic flux density, may increase depending on other arrangement conditions of the laser irradiation marks 15 and the laser irradiation mark rows 16.

The laser irradiation mark rows 16 that are adjacent to each other are preferably substantially parallel to each other, and may be non-parallel to each other. A portion in which the laser irradiation mark rows 16 are parallel to each other and a portion in which the laser irradiation mark rows 16 are non-parallel to each other may be mixed. The expression that the laser irradiation mark rows 16 are "parallel to each other" indicates that an angle between the laser irradiation mark rows 16 is 10° or less.

Each laser irradiation mark row 16 shown in FIG. 1 is substantially parallel to the width direction D2, and may be non-parallel to the width direction D2. A portion in which the laser irradiation mark 16 is parallel to the width direction D2 and a portion in which the laser irradiation mark 16 is non-parallel to the width direction D2 may be mixed. The expression that the laser irradiation mark row 16 is "parallel to" the width direction D2 indicates that an angle between the laser irradiation mark row 16 and the width direction D2 is 10° or less.

The line distance d1 is a distance between centers of the laser irradiation marks 15, which is measured in a middle portion of the width W1 of the amorphous metal ribbon 1. The middle portion refers to a region having a width half the width W1 with the middle point of the width W1 as the center. Therefore, when at least a part of the laser irradiation mark row 16 is provided in the middle portion, the laser irradiation mark row 16 may extend over the entire width W1 of the amorphous metal ribbon 1 or may extend over only a part of the width W1. That is, the laser irradiation mark row 16 may be partially interrupted, or the length of the laser irradiation mark row 16 in the width direction D2 may be shorter than the width W1 of the amorphous metal ribbon 1.

The distance between the laser irradiation mark rows 16 may be constant or may be partially different in the entire amorphous metal ribbon 1. That is, when the distance between the laser irradiation mark rows 16 is measured at a plurality of positions in the middle portion of one width W1 of the amorphous metal ribbon 1, a plurality of measured values may be the same as or may be different from each other. In the latter case, an average value of five measured values is set as the line distance d1 of the amorphous metal ribbon 1.

The laser irradiation marks 15 may be provided in only one of the first surface 11 and the second surface 12, or may be provided in both the first surface 11 and the second surface 12. When the laser irradiation marks 15 are provided on both the first surface 11 and the second surface 12, it is sufficient that the above range of the line distance d1 is satisfied in a state where the laser irradiation marks 15 provided on the second surface 12 are projected onto the first surface 11 and the projected laser irradiation marks 15 and the laser irradiation marks 15 provided on the first surface 11 match each other.

1.2. Spot Distance

The distance between the laser irradiation marks 15 in the laser irradiation mark row 16 shown in FIG. 2 is set as a spot distance d2. The spot distance d2 is preferably 0.10 mm or more and 0.50 mm or less, more preferably 0.15 mm or more and 0.40 mm or less, and still more preferably 0.20 mm or more and 0.40 mm or less. When the spot distance d2 is within the above range, the arrangement density of the laser irradiation marks 15 in the laser irradiation mark row 16 can be optimized. As a result, even when the measurement is performed under a condition of a high magnetic flux density, the iron loss and the excitation power of the amorphous metal ribbon 1 can be reduced.

When the spot distance d2 is less than the lower limit value, the excitation power of the amorphous metal ribbon 1, which is measured under the condition of a high magnetic flux density, may increase depending on other arrangement conditions of the laser irradiation marks 15 and the laser irradiation mark rows 16. When the spot distance d2 is more than the upper limit value, the iron loss of the amorphous metal ribbon 1, which is measured under the condition of a high magnetic flux density, may increase depending on other arrangement conditions of the laser irradiation marks 15 and the laser irradiation mark rows 16.

The spot distance d2 is a distance between centers of the laser irradiation marks 15, which is measured in a middle portion of the width W1 of the amorphous metal ribbon 1. The center of each laser irradiation mark 15 is the center of a perfect circle inscribed in the laser irradiation mark 15.

The distance between the laser irradiation marks 15 may be constant or may be partially different in the entire amorphous metal ribbon 1. That is, when the distance between the laser irradiation marks 15 is measured at a plurality of positions in the middle portion of one width W1 of the amorphous metal ribbon 1, a plurality of measured values may be the same as or may be different from each other. In the latter case, an average value of five measured values is set as the spot distance d2 of the amorphous metal ribbon 1.

When the laser irradiation marks 15 are provided on both the first surface 11 and the second surface 12, it is sufficient that the above range of the spot distance d2 is satisfied in a state where the laser irradiation marks 15 provided on the second surface 12 are projected onto the first surface 11 and the projected laser irradiation marks 15 and the laser irradiation marks 15 provided on the first surface 11 match each other.

1.3. Spot Diameter

An equivalent circle diameter of the laser irradiation mark 15 shown in FIG. 2 is set as a spot diameter d3. The spot diameter d3 is preferably 0.010 mm or more and 0.30 mm or less, more preferably 0.020 mm or more and 0.25 mm or less, and still more preferably 0.030 mm or more and 0.20 mm or less. When the spot diameter d3 is within the above range, the magnetic domain refinement based on the laser irradiation marks 15 can be efficiently performed. In addition, it is possible to prevent a decrease in mechanical strength of the amorphous metal ribbon 1 caused by the formation of the laser irradiation marks 15.

When the spot diameter d3 is less than the lower limit value, depending on other arrangement conditions of the laser irradiation marks 15 and the laser irradiation mark rows 16, the magnetic domain refinement may be insufficient, and the iron loss and the excitation power of the amorphous metal ribbon 1, which are measured under the condition of a high magnetic flux density, may increase. When the spot diameter d3 is more than the upper limit value, the mechanical strength of the amorphous metal ribbon 1 may decrease.

The spot diameter d3 is an average value of the circle equivalent diameters of 10 or more laser irradiation marks 15, which are measured in a middle portion of the width W1 of the amorphous metal ribbon 1. The equivalent circle diameter is a diameter of a perfect circle having an area same as that of the laser irradiation mark 15 when the first surface 11 is viewed in a plan view.

The equivalent circle diameters of the laser irradiation marks 15 may be the same as or different from each other. However, considering the influence of the laser irradiation marks 15 on the mechanical strength of the amorphous metal ribbon 1, it is preferable that the equivalent circle diameters of the laser irradiation marks 15 have a slight variation. Accordingly, when the amorphous metal ribbon 1 is curved, it is possible to prevent local concentration of stress. As a result, even when the laser irradiation marks 15 are arranged at a high density, the mechanical strength of the amorphous metal ribbon 1 is less likely to decrease.

Specifically, first, in the middle portion of the width W1 of the amorphous metal ribbon 1, a standard deviation and an average value of the equivalent circle diameters of 100 laser irradiation marks 15 are calculated. Next, a variation coefficient is calculated by dividing the standard deviation by the average value. The variation coefficient is an index indicating the degree of variation in equivalent circle diameters of the laser irradiation marks 15, and the larger the variation coefficient, the larger the degree of variation. In the amorphous metal ribbon 1, the variation coefficient is preferably 3% or more, more preferably 3% or more and 50% or less, and still more preferably 8% or more and 30% or less. By setting the degree of variation in equivalent circle diameters of the laser irradiation marks 15 within the above range, stress concentration relaxation along with an appropriate variation can be achieved, the decrease in mechanical strength of the amorphous metal ribbon 1 can be prevented, and the laser irradiation marks 15 can be arranged at a high density. As a result, it is possible to increase the degree of freedom of arrangement of the laser irradiation marks 15, and it is possible to sufficiently reduce the iron loss and the excitation power of the amorphous metal ribbon 1, which are measured under a condition of a high magnetic flux density.

In a case where the variation coefficient is less than the lower limit value, when the amorphous metal ribbon 1 is curved, the stress may be locally concentrated, and the mechanical strength of the amorphous metal ribbon 1 may be reduced. The variation coefficient may be more than the upper limit value, but depending on other arrangement conditions of the laser irradiation marks 15 and the laser irradiation mark rows 16, the excitation power of the amorphous metal ribbon 1 may increase, or the iron loss may not be sufficiently prevented, which are measured under the condition of a high magnetic flux density.

1.4. Spot Depth

The depth of the laser irradiation mark 15 shown in FIG. 3 is set as a spot depth d4. The spot depth d4 is preferably 0.0020 mm or more and 0.15 mm or less, more preferably 0.0030 mm or more and 0.10 mm or less, and still more preferably 0.0040 mm or more and 0.050 mm or less. When the spot depth d4 is within the above range, the magnetic domain refinement based on the laser irradiation marks 15 can be necessarily and sufficiently performed. In addition, it is possible to prevent a decrease in mechanical strength of the amorphous metal ribbon 1 caused by the formation of the laser irradiation marks 15.

When the spot depth d4 is less than the lower limit value, depending on other arrangement conditions of the laser irradiation marks 15 and the laser irradiation mark rows 16, the magnetic domain refinement may be insufficient and the iron loss and the excitation power of the amorphous metal ribbon 1, which are measured under the condition of a high magnetic flux density, may increase. When the spot depth d4 is more than the upper limit value, the mechanical strength of the amorphous metal ribbon 1 may decrease.

The spot depth d4 is an average value of the depths of 10 or more laser irradiation marks 15, which are measured in a middle portion of the width W1 of the amorphous metal ribbon 1.

The depths of the laser irradiation marks 15 may be the same as or different from each other.

1.5. Number Density of Laser Irradiation Marks

A number density D of the laser irradiation marks 15 can be represented by using the line distance d1 [mm] and the spot distance d2 [mm] in the amorphous metal ribbon 1. Specifically, the number density D of the laser irradiation marks 15 is represented by $(1/d1) \times (1/d2)$. The number density D is an index indicating the arrangement density based on the number of the laser irradiation marks 15. The number density D in the amorphous metal ribbon 1 is preferably 0.05 pieces/mm$^2$ or more and 0.50 pieces/mm$^2$ or less, more preferably 0.10 pieces/mm$^2$ or more and 0.40 pieces/mm$^2$ or less, and still more preferably 0.15 pieces/mm$^2$ or more and 0.35 pieces/mm$^2$ or less. When the number density D is within the above range, the magnetic domain refinement based on the laser irradiation marks 15 can be optimized, and even when the measurement is performed under a condition of a high magnetic flux density, the iron loss and the excitation power of the amorphous metal ribbon 1 can be reduced.

When the number density D is less than the lower limit value, the iron loss of the amorphous metal ribbon 1, which is measured under the condition of a high magnetic flux density, may not be sufficiently reduced. When the number density D is more than the upper limit value, an increase in excitation power of the amorphous metal ribbon 1, which is measured under the condition of a high magnetic flux density, may not be sufficiently prevented. When the amorphous metal ribbon 1 is curved, damages such as breakage may be likely to occur in the amorphous metal ribbon 1.

The number density D is calculated based on a region in which the laser irradiation mark rows 16 are arranged and which has a length in the length direction D1 of 1 m or more, in the middle portion of the width W1 of the amorphous metal ribbon 1. When the length L1 of the amorphous metal ribbon 1 is less than 1 m, the number density D is calculated based on the total length.

When the laser irradiation marks 15 are provided on both the first surface 11 and the second surface 12, it is sufficient that the above range of the number density D is satisfied in a state where the laser irradiation marks 15 provided on the second surface 12 are projected onto the first surface 11 and the projected laser irradiation marks 15 and the laser irradiation marks 15 provided on the first surface 11 match each other.

1.6. Volume Occupancy Rate of Laser Irradiation Marks

A volume occupancy rate V of the laser irradiation marks 15 can be represented by using the line distance d1, the spot distance d2, the spot diameter d3, and the spot depth d4 in the amorphous metal ribbon 1. Specifically, the volume occupancy rate V (%) of the laser irradiation marks 15 is represented by $(1/d1 \times d3 \times d4) \times (1/d2) \times 100$. The volume occupancy rate V is an index indicating the arrangement density based on a volume of the laser irradiation marks 15. The volume occupancy rate V in the amorphous metal ribbon 1 is 0.00057% or more and 0.010% or less, preferably 0.0010% or more and 0.0080% or less, and more preferably 0.0030% or more and 0.0057% or less. When the volume occupancy rate V is within the above range, the magnetic domain refinement based on the laser irradiation marks 15 can be optimized, and even when the measurement is performed under a condition of a high magnetic flux density, the iron loss and the excitation power of the amorphous metal ribbon 1 can be reduced. When the volume occupancy rate V is within the above range, the influence of the laser irradiation marks 15 on the mechanical strength of the amorphous metal ribbon 1 can be prevented to be small. Therefore, even when the amorphous metal ribbon 1 is curved, breakage or the like of the amorphous metal ribbon 1 is less likely to occur, and a good curved state can be maintained.

When the volume occupancy rate V is less than the lower limit value, the iron loss of the amorphous metal ribbon 1, which is measured under the condition of a high magnetic flux density, may not be sufficiently reduced. When the volume occupancy rate V is more than the upper limit value, an increase in excitation power of the amorphous metal ribbon 1, which is measured under the condition of a high magnetic flux density, may not be sufficiently prevented. When the amorphous metal ribbon 1 is curved, damages such as breakage may be likely to occur in the amorphous metal ribbon 1.

The volume occupancy rate V is calculated based on a region in which the laser irradiation mark rows 16 are arranged and which has a length in the length direction D1 of 1 m or more, in the middle portion of the width W1 of the amorphous metal ribbon 1. When the length L1 of the amorphous metal ribbon 1 is less than 1 m, the volume occupancy rate V is calculated based on the total length.

When the laser irradiation marks 15 are provided on both the first surface 11 and the second surface 12, it is sufficient that the above range of the volume occupancy rate V is satisfied in a state where the laser irradiation marks 15 provided on the second surface 12 are projected onto the first surface 11 and the projected laser irradiation marks 15 and the laser irradiation marks 15 provided on the first surface 11 match each other.

As described above, the amorphous metal ribbon 1 according to the present embodiment includes a plurality of the laser irradiation mark rows 16 each including a plurality of the laser irradiation marks 15 arranged in a row. In the amorphous metal ribbon 1, a distance between the laser irradiation mark rows 16 that are adjacent to each other is set as the line distance d1, a distance between the laser irradiation marks 15 in the laser irradiation mark row 16 is set as the spot distance d2, a diameter of the laser irradiation mark 15 is set as the spot diameter d3, and a depth of the laser irradiation mark 15 is set as the spot depth d4.

In the amorphous metal ribbon 1, when the volume occupancy rate V of the laser irradiation marks 15 is set as $(1/d1 \times d3 \times d4) \times (1/d2) \times 100$, the volume occupancy rate V of the laser irradiation marks 15 is 0.00057% or more and 0.010% or less.

According to such a configuration, the arrangement density of the laser irradiation marks 15 based on the volume can be optimized, and the magnetic domain refinement based on the laser irradiation marks 15 can be optimized. As a result, even when the measurement is performed at a relatively high magnetic flux density of, for example, 1.45 T, the iron loss and the excitation power of the amorphous metal ribbon 1 can be reduced. Therefore, the amorphous metal ribbon 1 according to the present embodiment can contribute to, for example, when the amorphous metal ribbon 1 is used in a transformer, miniaturization of the transformer and high efficiency of the transformer.

Even when such an amorphous metal ribbon 1 is curved, it is possible to prevent the damages such as breakage from occurring. Therefore, the amorphous metal ribbon 1 can be curved with a small bending radius, and miniaturization of the magnetic core can be achieved. From this viewpoint, the amorphous metal ribbon 1 also contributes to the miniaturization of the transformer or the like.

As described above, in the amorphous metal ribbon 1 according to the present embodiment, the line distance d1 between the laser irradiation mark rows 16 is preferably 10 mm or more and 60 mm or less. The spot distance d2 between the laser irradiation marks 15 is preferably 0.10 mm or more and 0.50 mm or less. The spot diameter d3 of the laser irradiation mark 15 is preferably 0.010 mm or more and 0.30 mm or less.

According to such a configuration, the magnetic domain refinement based on the laser irradiation marks 15 can be optimized. As a result, the iron loss and the excitation power of the amorphous metal ribbon 1 can be sufficiently reduced.

1.7. Alloy Composition

As described above, the amorphous metal constituting the amorphous metal ribbon 1 is preferably a Fe-based amorphous alloy.

As the Fe-based amorphous alloy, a Fe-Si-B-based alloy or a Fe-Si-B-C-based alloy among the alloys described above is particularly preferably used. Among these, the Fe-Si-B-based alloy is made of Fe, Si, B, and impurities. The Fe-Si-B-based alloy has a chemical composition in which, when the total content of Fe, Si, and B is 100 atomic %, a Fe content is 78 atomic % or more, a B content is 11 atomic % or more, and the total content of Si and B is 17 atomic % or more and 22 atomic % or less.

Fe is a metal element having a large magnetic moment, and determines the magnetic flux density of the amorphous metal ribbon 1. The Fe content is preferably 80 atomic % or more and 82 atomic % or less.

Si and B determine an amorphous-forming ability of the Fe-based amorphous alloy. A Si content is preferably 2.0 atomic % or more and 6.0 atomic % or less, and more preferably 3.5 atomic % or more and 6.0 atomic % or less. The B content is preferably 12 atomic % or more and 16 atomic % or less, and more preferably 13 atomic % or more and 16 atomic % or less. As described above, the total content of Si and B is preferably 17 atomic % or more and 22 atomic % or less.

In the Fe-based amorphous alloy having such a chemical composition, in particular, by setting the Fe content within the above range, it is possible to improve the magnetic flux density while improving the amorphous-forming ability. Therefore, it is possible to obtain the amorphous metal ribbon 1 that exhibits excellent soft magnetism derived from amorphous substances and has a high saturation magnetic flux density. In particular, by setting the total content of Si and B within the above range, it is possible to obtain the amorphous metal ribbon 1 in which the iron loss and the excitation power are sufficiently reduced.

1.8. Iron Loss and Excitation Power

In the amorphous metal ribbon 1 according to the present embodiment, as described above, the iron loss and the excitation power that are measured under the condition of a high magnetic flux density can be particularly reduced.

Specifically, the iron loss of the amorphous metal ribbon 1 under a condition of a frequency of 60 Hz and a magnetic flux density of 1.45 T is preferably 0.150 W/kg or less, more preferably 0.140 W/kg or less, and still more preferably 0.130 W/kg or less.

The excitation power of the amorphous metal ribbon 1 under the condition of a frequency of 60 Hz and a magnetic flux density of 1.45 T is preferably 0.180 VA/kg or less, more preferably 0.170 VA/kg or less, and still more preferably 0.165 VA/kg or less.

When the amorphous metal ribbon 1 satisfying such iron loss and excitation power is used for, for example, a transformer, the amorphous metal ribbon 1 greatly contributes to high efficiency of the transformer.

1.9. Magnetic Flux Density

In the amorphous metal ribbon 1 according to the present embodiment, it is possible to reduce the excitation power measured under the condition of a high magnetic flux density, and therefore, it is possible to prevent a decrease in magnetic flux density caused by an increase in excitation power. Therefore, it is possible to realize a high magnetic flux density in the amorphous metal ribbon 1. Specifically, in the amorphous metal ribbon 1, the magnetic flux density under a condition of a frequency of 60 Hz and a magnetic field of 7.9557 A/m is preferably 1.52 T or more, and more preferably 1.62 T or more. When such an amorphous metal ribbon 1 is used for, for example, a transformer, the amorphous metal ribbon 1 contributes to the miniaturization of the transformer.

2. Method for Manufacturing Amorphous Metal Ribbon

Next, a method for manufacturing the amorphous metal ribbon according to the embodiment will be described.

Figure 4:
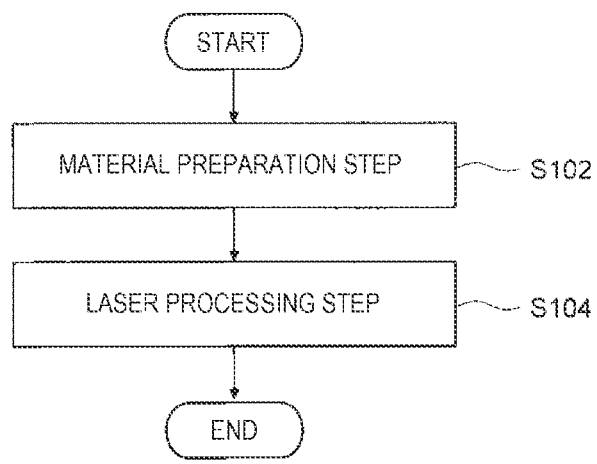
FIG. 4 is a flowchart showing a method for manufacturing the amorphous metal ribbon according to the embodiment.

FIG. 4 is a flowchart showing the method for manufacturing the amorphous metal ribbon according to the embodiment.

The method for manufacturing the amorphous metal ribbon shown in FIG. 4 includes a material preparation step S102 and a laser processing step S104. In the material preparation step S102, a material ribbon made of an amorphous metal is prepared. In the laser processing step S104, laser processing is performed on one of two main surfaces of the material ribbon that are in a front and back relation, and an amorphous metal ribbon having a plurality of laser irradiation mark rows each including a plurality of laser irradiation marks arranged in a row is obtained.

In the amorphous metal ribbon, a distance between the laser irradiation mark rows that are adjacent to each other is set as the line distance d1, a distance between the laser irradiation marks in the laser irradiation mark row is set as the spot distance d2, a diameter of the laser irradiation mark is set as the spot diameter d3, and a depth of the laser irradiation mark is set as the spot depth d4.

In the amorphous metal ribbon, when the volume occupancy rate V of the laser irradiation marks is set as $(1/d1 \times d3 \times d4) \times (1/d2) \times 100$, the volume occupancy rate V of the laser irradiation marks is 0.00057% or more and 0.010% or less.

According to such a configuration, the arrangement density of the laser irradiation marks of the manufactured amorphous metal ribbon based on the volume can be optimized, and the magnetic domain refinement based on the laser irradiation marks can be optimized. As a result, it is possible to efficiently manufacture an amorphous metal ribbon in which the iron loss and the excitation power under the condition of a high magnetic flux density are reduced. Even when the amorphous metal ribbon is curved, it is possible to efficiently manufacture an amorphous metal ribbon in which damages such as breakage are less likely to occur.

2.1. Material Preparation Step

The material ribbon is manufactured by, for example, a method for manufacturing a rapidly solidified ribbon, such as a single roll method. The material preparation step S102 may be a step of manufacturing the material ribbon by such a manufacturing method, may include a step of cutting the material ribbon manufactured by the manufacturing method described above into a necessary length, or may be a step of only preparing the material ribbon.

2.2. Laser Processing Step

In the laser processing step S104, laser processing is performed on at least one of two main surfaces of the material ribbon, and laser irradiation marks are formed. The arrangement and the like of the laser irradiation marks are the same as the arrangement and the like of the laser irradiation marks 15 in the amorphous metal ribbon 1 described above.

Conditions of the laser processing vary depending on the alloy composition and the like of the material ribbon. As an example, an output of laser in the laser processing is preferably 0.4 mJ or more and 2.5 mJ or less, and more preferably 1.0 mJ or more and 2.0 mJ or less.

A diameter of a laser beam in the laser processing determines the spot diameter d3 described above. As an example, the diameter of the laser beam is preferably 0.010 mm or more and 0.30 mm or less, and more preferably 0.020 mm or more and 0.25 mm or less.

An energy density of the laser in the laser processing determines the spot diameter d3 and the depth of the laser irradiation mark described above. As an example, the energy density of the laser is preferably 0.01 $J/mm^2$ or more and 1.50 $J/mm^2$ or less, and more preferably 0.03 $J/mm^2$ or more and 1.00 $J/mm^2$ or less.

A wavelength of the laser in the laser processing is, for example, preferably 250 nm or more and 1100 mm or less, and more preferably 900 nm or more and 1100 nm or less.

A laser light source in the laser processing includes, for example, a YAG laser, a $CO_2$ gas laser, a semiconductor laser, and a fiber laser. Among these, from the viewpoint of being capable of emitting high-frequency pulsed laser light with high output, the fiber laser is preferably used. A pulse width of the pulsed laser light is preferably 50 nanoseconds or more, and more preferably 100 nanoseconds or more. The pulse width is a time during which laser irradiation is performed, and when the pulse width is small, the irradiation time is shorter. By setting the pulse width within the above range, a laser irradiation mark having an appropriate size and depth can be efficiently formed.

3. Magnetic Core

Next, a magnetic core according to the embodiment will be described.

Figure 5:
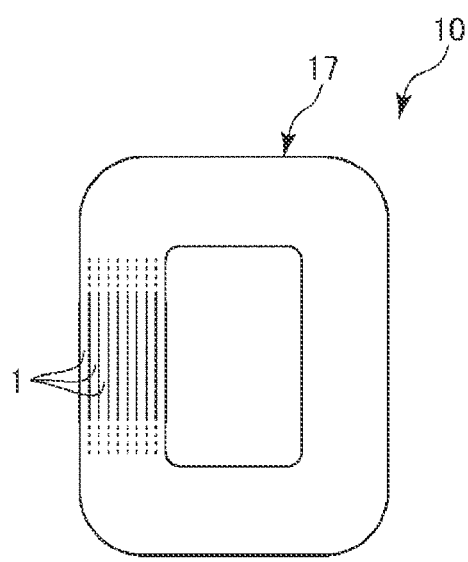
FIG. 5 is a schematic view showing a magnetic core according to the embodiment.

FIG. 5 is a schematic view showing the magnetic core according to the embodiment.

A magnetic core 10 shown in FIG. 5 is made of a laminate 17 obtained by laminating a plurality of amorphous metal ribbons 1. Specifically, an annular magnetic core 10 shown in FIG. 5 is formed by curving the laminate 17 and overlapping and wrapping both ends of the laminate 17. A well-known overlapping and wrapping method is used as the overlapping and wrapping method.

A shape of the magnetic core 10 is not limited to the shape shown in FIG. 5, and may be any shape.

The amorphous metal ribbons 1 provided in the laminate 17 are preferably insulated from each other. For the insulation, for example, a resin coating can be used.

As described above, the magnetic core 10 includes the amorphous metal ribbons 1 described above. Accordingly, even when the measurement is performed under a condition of a high magnetic flux density, a magnetic core 10 having low iron loss and excitation power can be obtained.

Such a magnetic core 10 is suitably used for, for example, a transformer, a saturated reactor, and a magnetic switch.

The amorphous metal ribbon, the method for manufacturing the amorphous metal ribbon, and the magnetic core according to the present disclosure have been described above based on preferred embodiments, but the present disclosure is not limited thereto.

EXAMPLES

Next, specific Examples of the present disclosure will be described.

4. Manufacturing of Amorphous Metal Ribbon 4.1. Example 1

First, a material ribbon made of an amorphous metal having an alloy composition of $Fe_{82}Si_4B_{14}$ and having a thickness of 25 μm and a width of 210 mm was manufactured by a single roll method. $Fe_{82}Si_4B_{14}$ means an alloy composition in which when the total content of Fe, Si, and B is 100 atomic %, the Fe content is 82 atomic %, the Si content is 4 atomic %, and the B content is 14 atomic %.

Next, a sample piece having a size of a length of 120 mm and a width of 25 mm was cut out from the manufactured material ribbon.

Next, the laser processing is performed on at least one main surface of the cut sample piece, and laser irradiation marks were formed. In this case, the spot diameters of the laser irradiation marks were adjusted by changing the energy density of the laser beam. As shown in FIG. 1, the laser irradiation mark rows including the laser irradiation marks were formed over the entire width direction of the material ribbon. Table 1 shows arrangement conditions of the laser irradiation marks. Accordingly, an amorphous metal ribbon was obtained.

4.2. Examples 2 to 34

Amorphous metal ribbons were obtained in the same manner as in Example 1 except that the arrangement conditions of the laser irradiation marks were changed as shown in Table 1 or 2.

4.3. Comparative Examples 1 to 12

Amorphous metal ribbons were obtained in the same manner as in Example 1 except that the arrangement conditions of the laser irradiation marks were changed as shown in Table 1 or 2.

5. Evaluation of Amorphous Metal Ribbon 5.1. Iron Loss

For the amorphous metal ribbons obtained in Examples and Comparative Examples, the iron loss under the condition of a frequency of 60 Hz and a magnetic flux density of 1.45 T was measured. Next, measurement results were evaluated in light of the following evaluation criteria.

A: the iron loss is 0.120 W/kg or less
B: the iron loss is more than 0.120 W/kg and 0.130 W/kg or less
C: the iron loss is more than 0.130 W/kg and 0.140 W/kg or less
D: the iron loss is more than 0.140 W/kg and 0.150 W/kg or less
E: the iron loss is more than 0.150 W/kg and 0.160 W/kg or less
F: the iron loss is more than 0.160 W/kg The evaluation results are shown in Tables 1 and 2.

5.2. Excitation Power

For the amorphous metal ribbons obtained in Examples and Comparative Examples, the excitation power under the condition of the frequency of 60 Hz and the magnetic flux density of 1.45 T was measured. Next, measurement results were evaluated in light of the following evaluation criteria.

A: the excitation power is 0.135 VA/kg or less
B: the excitation power is more than 0.135 VA/kg and 0.150 VA/kg or less
C: the excitation power is more than 0.150 VA/kg and 0.165 VA/kg or less
D: the excitation power is more than 0.165 VA/kg and 0.180 VA/kg or less
E: the excitation power is more than 0.180 VA/kg and 0.195 VA/kg or less
F: the excitation power is more than 0.195 VA/kg The evaluation results are shown in Tables 1 and 2.

TABLE 1

| | Arrangement condition of laser irradiation mark | | | | | | Evaluation result | | |
|---|---|---|---|---|---|---|---|---|---|
| | Line distance d1 mm | Spot distance d2 mm | Spot diameter d3 mm | Spot depth d4 mm | Number density D piece/mm² | Volume occupancy rate V % | Variation coefficient of diameter of irradiation mark % | Iron loss — | Excitation power — | Bending resistance — |
| Comparative Example 1 | 10 | 0.10 | 0.030 | 0.006 | 1.000 | 0.0180 | 20 | A | F | F |
| Example 1 | 20 | 0.10 | 0.030 | 0.006 | 0.500 | 0.0090 | 11 | A | D | D |
| Example 2 | 30 | 0.10 | 0.030 | 0.006 | 0.333 | 0.0060 | 10 | A | C | B |
| Example 3 | 40 | 0.10 | 0.030 | 0.006 | 0.250 | 0.0045 | 13 | A | C | B |
| Example 4 | 50 | 0.10 | 0.030 | 0.006 | 0.200 | 0.0036 | 12 | A | C | B |
| Example 5 | 60 | 0.10 | 0.030 | 0.006 | 0.167 | 0.0030 | 15 | A | D | B |
| Example 6 | 10 | 0.20 | 0.030 | 0.006 | 0.500 | 0.0090 | 22 | A | D | D |
| Example 7 | 20 | 0.20 | 0.030 | 0.006 | 0.250 | 0.0045 | 13 | A | A | A |
| Example 8 | 30 | 0.20 | 0.030 | 0.006 | 0.167 | 0.0030 | 16 | A | A | A |
| Example 9 | 40 | 0.20 | 0.030 | 0.006 | 0.125 | 0.0023 | 25 | B | A | A |
| Example 10 | 50 | 0.20 | 0.030 | 0.006 | 0.100 | 0.0018 | 18 | B | A | A |
| Example 11 | 60 | 0.20 | 0.030 | 0.006 | 0.083 | 0.0015 | 21 | C | B | A |
| Example 12 | 10 | 0.30 | 0.030 | 0.006 | 0.333 | 0.0060 | 20 | A | A | A |
| Example 13 | 20 | 0.30 | 0.030 | 0.006 | 0.167 | 0.0030 | 17 | A | A | A |
| Example 14 | 30 | 0.30 | 0.030 | 0.006 | 0.111 | 0.0020 | 16 | B | A | A |
| Example 15 | 40 | 0.30 | 0.030 | 0.006 | 0.083 | 0.0015 | 14 | C | B | A |
| Example 16 | 50 | 0.30 | 0.030 | 0.006 | 0.067 | 0.0012 | 12 | C | B | A |
| Example 17 | 60 | 0.30 | 0.030 | 0.006 | 0.056 | 0.0010 | 25 | C | C | A |
| Example 18 | 10 | 0.40 | 0.025 | 0.006 | 0.250 | 0.0039 | 34 | A | A | A |
| Example 19 | 20 | 0.40 | 0.025 | 0.006 | 0.125 | 0.0020 | 15 | B | A | A |
| Example 20 | 30 | 0.40 | 0.025 | 0.006 | 0.083 | 0.0013 | 12 | C | A | A |
| Example 21 | 40 | 0.40 | 0.025 | 0.006 | 0.063 | 0.0010 | 16 | C | C | A |
| Example 22 | 50 | 0.40 | 0.025 | 0.006 | 0.050 | 0.0008 | 23 | D | C | A |
| Example 23 | 60 | 0.40 | 0.025 | 0.006 | 0.042 | 0.0007 | 15 | D | D | A |
| Example 24 | 10 | 0.50 | 0.025 | 0.006 | 0.200 | 0.0031 | 11 | B | A | A |
| Example 25 | 20 | 0.50 | 0.025 | 0.006 | 0.100 | 0.0016 | 10 | B | A | A |
| Example 26 | 30 | 0.50 | 0.025 | 0.006 | 0.067 | 0.0010 | 9 | C | C | B |
| Example 27 | 40 | 0.50 | 0.025 | 0.006 | 0.050 | 0.0008 | 17 | D | D | A |
| Comparative Example 2 | 50 | 0.50 | 0.025 | 0.005 | 0.040 | 0.0005 | 16 | E | D | A |
| Comparative Example 3 | 60 | 0.50 | 0.025 | 0.006 | 0.033 | 0.0005 | 13 | F | E | A |

TABLE 2

| | Arrangement condition of laser irradiation mark | | | | | | Evaluation result | | |
|---|---|---|---|---|---|---|---|---|---|
| | Line distance d1 mm | Spot distance d2 mm | Spot diameter d3 mm | Spot depth d4 mm | Number density D piece/mm² | Volume occupancy rate V % | Variation coefficient of diameter of irradiation mark % | Iron loss — | Excitation power — | Bending resistance — |
| Comparative Example 4 | 50 | 0.40 | 0.015 | 0.003 | 0.050 | 0.0002 | 17 | F | D | A |

TABLE 2-continued

| | Arrangement condition of laser irradiation mark | | | | | | Evaluation result | | |
|---|---|---|---|---|---|---|---|---|---|
| | Line distance d1 mm | Spot distance d2 mm | Spot diameter d3 mm | Spot depth d4 mm | Number density D piece/mm² | Volume occupancy rate V % | Variation coefficient of diameter of irradiation mark % | Iron loss | Excitation power | Bending resistance |
| Example 28 | 50 | 0.40 | 0.050 | 0.010 | 0.050 | 0.0025 | 16 | B | B | B |
| Example 29 | 50 | 0.40 | 0.070 | 0.014 | 0.050 | 0.0049 | 20 | A | B | A |
| Example 30 | 50 | 0.40 | 0.100 | 0.020 | 0.050 | 0.0100 | 23 | A | D | D |
| Comparative Example 5 | 50 | 0.40 | 0.225 | 0.045 | 0.050 | 0.0506 | 19 | A | E | F |
| Comparative Example 6 | 50 | 0.40 | 0.250 | 0.050 | 0.050 | 0.0625 | 24 | A | F | F |
| Comparative Example 7 | 60 | 0.30 | 0.275 | 0.055 | 0.056 | 0.0840 | 13 | F | D | A |
| Example 31 | 60 | 0.30 | 0.050 | 0.010 | 0.056 | 0.0028 | 16 | A | B | A |
| Example 32 | 60 | 0.30 | 0.070 | 0.014 | 0.056 | 0.0054 | 24 | A | B | A |
| Comparative Example 8 | 60 | 0.30 | 0.125 | 0.025 | 0.056 | 0.0174 | 16 | A | E | E |
| Comparative Example 9 | 60 | 0.30 | 0.150 | 0.030 | 0.056 | 0.0250 | 22 | A | E | F |
| Comparative Example 10 | 60 | 0.30 | 0.175 | 0.035 | 0.056 | 0.0340 | 12 | A | F | F |
| Comparative Example 11 | 70 | 0.25 | 0.200 | 0.040 | 0.057 | 0.0457 | 20 | B | F | F |
| Comparative Example 12 | 70 | 0.30 | 0.250 | 0.050 | 0.048 | 0.0595 | 18 | B | F | F |
| Example 33 | 20 | 0.30 | 0.030 | 0.006 | 0.167 | 0.0030 | 2 | A | A | D |
| Example 34 | 20 | 0.30 | 0.030 | 0.006 | 0.167 | 0.0030 | 62 | A | D | A |

As is clear from Tables 1 and 2, the amorphous metal ribbons obtained in Examples are lower in both iron loss and excitation power when the iron loss and the excitation power are measured at a relatively high magnetic flux density of 1.45 T as compared with the amorphous metal ribbons obtained in Comparative Examples.

5.3. Magnetic Flux Density

For the amorphous metal ribbons obtained in Examples and Comparative Examples, the magnetic flux density under the condition of a frequency of 60 Hz and a magnetic field of 7.9557 A/m was measured.

As a result, all of the amorphous metal ribbons obtained in Examples have a magnetic flux density of 1.52 T or more, and show a high magnetic flux density as compared with the amorphous metal ribbons obtained in Comparative Examples.

5.4. Bending Resistance

For the amorphous metal ribbons obtained in Examples and Comparative Examples, bending resistance was evaluated using a cylindrical mandrel testing machine specified in JIS K5600-5-1. Specifically, a test was performed in which the amorphous metal ribbon was bent along a core rod having a diameter of 0.73 mm and a bending angle was gradually reduced from 180° toward 0°. Next, the bending angle at which the amorphous metal ribbon was broken was recorded, and the bending angle was evaluated in light of the following evaluation criteria.

A: the bending angle at the time of breakage is 30° or less
B: the bending angle at the time of breakage is more than 30° and 60° or less
C: the bending angle at the time of breakage is more than 60° and 90° or less
D: the bending angle at the time of breakage is more than 90° and 120° or less
E: the bending angle at the time of breakage is more than 120° and 150° or less
F: the bending angle at the time of breakage is more than 150° and 180° or less The evaluation results are shown in Table 1.

As shown in Table 1, it is confirmed that the amorphous metal ribbons obtained in Examples have a bending angle at which the amorphous metal ribbons are broken smaller than those of the amorphous metal ribbons obtained in Comparative Examples. Therefore, it is confirmed that the amorphous metal ribbons obtained in Examples have excellent bending resistance. Such amorphous metal ribbons contribute to, for example, the miniaturization of a magnetic core.

What is claimed is:

1. An amorphous metal ribbon, comprising:
a plurality of laser irradiation mark rows each including a plurality of laser irradiation marks arranged in a row, wherein
a distance between the plurality of laser irradiation mark rows that are adjacent to each other is set as d1,
a distance between the plurality of laser irradiation marks in each laser irradiation mark row of the plurality of laser irradiation mark rows is set as d2,
a diameter of a laser irradiation mark of the plurality of laser irradiation marks is set as d3,
a depth of the laser irradiation mark which is set as d4 is 0.0055 mm or more and 0.15 mm or less, and
a volume occupancy rate V of the plurality of laser irradiation marks is set as $(1/d1 \times d3 \times d4) \times (1/d2) \times 100$, the volume occupancy rate V of the plurality of laser irradiation marks is 0.00057% or more and 0.010% or less.

2. The amorphous metal ribbon according to claim 1, wherein
a number density D of the plurality of laser irradiation marks is 0.05 pieces/mm² or more and 0.50 pieces/mm² or less.

3. The amorphous metal ribbon according to claim 1, wherein
 the distance d1 between the plurality of laser irradiation mark rows is 10 mm or more and 60 mm or less,
 the distance d2 between the plurality of laser irradiation marks is 0.10 mm or more and 0.50 mm or less, and
 the diameter d3 of the laser irradiation mark is 0.010 mm or more and 0.30 mm or less.

4. The amorphous metal ribbon according to claim 1, wherein
 a thickness is 10 μm or more and 50 μm or less.

5. The amorphous metal ribbon according to claim 1, wherein
 an iron loss under a condition of a frequency of 60 Hz and a magnetic flux density of 1.45 T is 0.150 W/kg or less, and
 an excitation power under the condition of the frequency of 60 Hz and the magnetic flux density of 1.45 T is 0.180 VA/kg or less.

6. The amorphous metal ribbon according to claim 1, wherein
 a variation coefficient obtained based on division of a standard deviation of equivalent circle diameters of 100 of the plurality of laser irradiation marks by an average value is 3% or more, wherein a number of the plurality of laser irradiation marks is 100.

7. A method for manufacturing an amorphous metal ribbon, comprising:
 preparing a material ribbon having a main surface made of an amorphous metal; and
 applying laser processing to the main surface of the material ribbon to obtain the amorphous metal ribbon having a plurality of laser irradiation mark rows each including a plurality of laser irradiation marks arranged in a row, wherein
  a distance between the plurality of laser irradiation mark rows that are adjacent to each other is set as d1,
  a distance between the plurality of laser irradiation marks in each laser irradiation mark row is set as d2,
  a diameter of a laser irradiation mark of the plurality of laser irradiation marks is set as d3,
  a depth of the laser irradiation mark which is set as d4 is 0.0055 mm or more and 0.15 mm or less, and
  a volume occupancy rate V of the plurality of laser irradiation marks is set as $(1/d1 \times d3 \times d4) \times (1/d2) \times 100$, the volume occupancy rate V of the plurality of laser irradiation marks is 0.00057% or more and 0.010% or less.

8. A magnetic core, comprising:
the amorphous metal ribbon according to claim 1.

* * * * *